(12) United States Patent
Shotey et al.

(10) Patent No.: US 8,415,563 B1
(45) Date of Patent: Apr. 9, 2013

(54) ADJUSTABLE ELECTRICAL BOX

(75) Inventors: Marcus J. Shotey, Scottsdale, AZ (US); Jeffrey P. Baldwin, Phoenix, AZ (US)

(73) Assignee: Hubbell Incorporated, Shelton, CT (US)

( * ) Notice: Subject to any disclaimer, the term of this patent is extended or adjusted under 35 U.S.C. 154(b) by 292 days.

(21) Appl. No.: 12/851,512

(22) Filed: Aug. 5, 2010

Related U.S. Application Data

(60) Provisional application No. 61/231,845, filed on Aug. 6, 2009.

(51) Int. Cl.
*H01H 9/02* (2006.01)

(52) U.S. Cl. ............. 174/58; 174/50; 174/54; 439/535; 248/906

(58) Field of Classification Search ............. 174/50, 174/58, 54, 62, 64, 535; 439/535; 220/4.02; 248/906; 361/600
See application file for complete search history.

(56) References Cited

U.S. PATENT DOCUMENTS

| 2,757,817 | A | * | 8/1956 | Egan | 220/3.5 |
| 5,600,093 | A | * | 2/1997 | Herth et al. | 174/53 |
| 7,855,338 | B2 | * | 12/2010 | Troder | 174/50 |

* cited by examiner

*Primary Examiner* — Dhirubhai R Patel
(74) *Attorney, Agent, or Firm* — Booth Udall Fuller, PLC

(57) ABSTRACT

An electrical box including at least four sides extending from a bottom to an open top and at least two device securing protrusions each having an aperture adjacent to each of at least two sides, each device securing aperture including an opening extending toward the open top of the electrical box, at least one mounting slot within one of the at least four sides, a mounting screw extending through the at least one mounting slot and adapted to secure the electrical box to a stud, and wherein the mounting screw is manipulated from within the open top and permits movement of the electrical box relative to the stud when the mounting screw is at least partially disengaged.

20 Claims, 5 Drawing Sheets

ADJUSTABLE ELECTRICAL BOX

CROSS REFERENCE TO RELATED APPLICATIONS

This application claims the benefit of the filing date of U.S. Provisional Patent Application 61/231,845 entitled "Adjustable Electrical Box" to Marcus Shotey, et al. which was filed on Aug. 6, 2009, the contents of which are hereby incorporated herein by reference.

BACKGROUND

1. Technical Field

Aspects of this document relate generally to electrical boxes.

2. Background Art

Electrical boxes are conventionally used to mount and house one or more electrical devices within a wall or other structure. Such conventional electrical boxes typically consist of a generally box-shaped structure that is mounted to a wall stud or other interior wall structure via one or more nails, screws, or other fastening devices. An electrical box is typically a one-piece structure and contains an opening for an electrical device or connector which is typically installed within the box after the box is mounted within a wall.

SUMMARY

Aspects of this document relate to electrical boxes. In one aspect, an electrical box may comprise at least four walls extending from a rear wall to an open top and at least two device securing protrusions each having an aperture adjacent to each of at least two sides, each device securing an aperture comprising an opening extending toward the open top of the electrical box, at least one mounting slot within one of the at least four sides, a mounting screw extending through the at least one mounting slot and adapted to secure the electrical box to a stud, and wherein the mounting screw is manipulated from within the open top and permits movement of the electrical box relative to the stud when the mounting screw is at least partially disengaged.

Particular implementations may comprise one or more of the following features. The electrical box may further comprise a track proximate the at least one mounting slot and a mounting screw tab, wherein the mounting screw tab slidingly engages the track. The electrical box may further comprise a plurality of teeth within the track and a plurality of teeth extending from a back side of the mounting screw tab, wherein the track teeth are complimentary shaped to the mounting screw tab teeth. The tab teeth and the track teeth may be engaged with each other to prevent relative movement when the mounting screw is in an engaged position and the tab teeth and the track teeth permit relative movement when the mounting screw is in a disengaged position.

In additional particular implementations, the tab teeth and the track teeth may be arranged vertically within the track and mounting screw tab. The mounting screw tab may further comprise a through hole disposed at an angle relative to the back side. The mounting screw tab may be movable in a single plane when the mounting screw tab is located within the track. The electrical box may be movable in a single plane when the mounting screw is located within the track. The electrical box may be rotatable to control the at least one mounting slot position.

The electrical box at least one mounting slot may be a pair of mounting slots. The electrical box may further comprise a track and a plurality of teeth proximate each of the mounting slots. The electrical box may further comprise a pair of mounting screw tabs each having a plurality of teeth wherein each tab is slidingly engaged with the track and the tab teeth are selectively engaged with the mounting slot teeth. The tab may be slideable with respect to the track and the tab teeth are disengaged from the electrical box teeth when the mounting screw is in a disengaged position. The tab teeth and the electrical box teeth may be engaged and prevent slideable movement between the tab and the track.

The electrical box may further comprise at least one external guide for sliding engagement with the stud. The at least one external guide may be a pair of external guides, each external guide located proximate at least one mounting slot. The mounting screw tab may cover the entire mounting slot. The electrical box may be adjustable in a direction perpendicular to the longitudinal axis of the stud.

Aspects also relate to a method of adjusting an electrical box comprising the steps of providing an electrical box with at least one mounting slot in a side wall and a track at least partially surrounding the at least one mounting slot from within the electrical box, inserting a mounting screw tab having a through hole within the track, inserting a mounting screw in the through hole, and rotating the mounting screw in a first direction from within the electrical box to mount the electrical box to a stud and prevent relative movement between the electrical box and the mounting screw tab. A particular implementation may also include the steps of rotating the mounting screw in a second direction opposite the first direction from within the electrical box to permit movement of the mounting screw tab with respect to the track, sliding the electrical box to a second position, and rotating the mounting screw in the first direction from within the electrical box to lock the electrical box in the second position.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Embodiments of the present invention will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended operation and assembly procedures for an electrical box will become apparent for use with implementations of an electrical box from this disclosure. Accordingly, for example, although particular components are disclosed, such components and other implementing components may comprise any shape, size, style, type, model, version, measurement, concentration, material, quantity, and/or the like as is known in the art for such implementing components, consistent with the intended operation of an electrical box.

Figure 1:
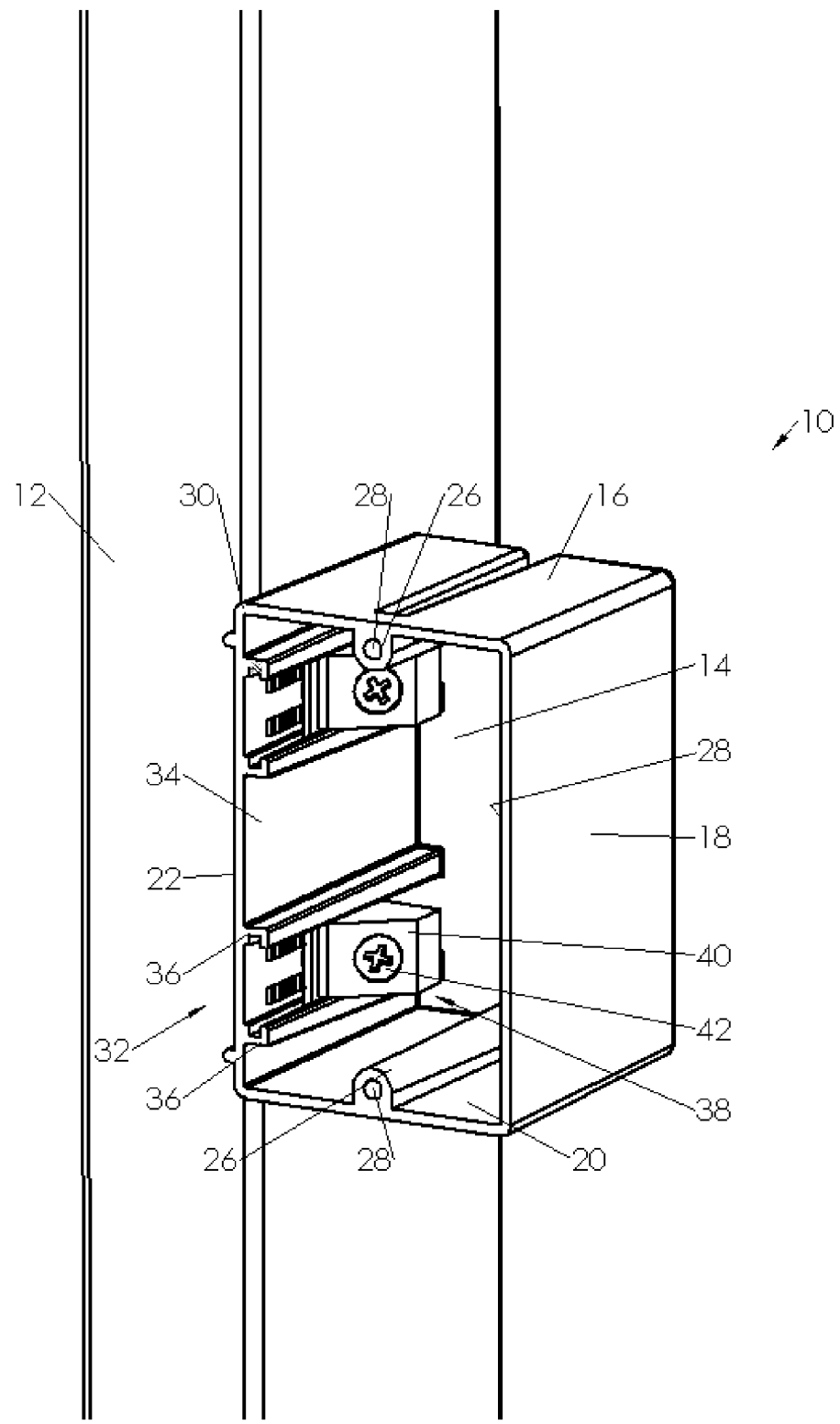
FIG. 1 is a perspective view of an adjustable electrical box mounted to a stud with a mounting screw and mounting screw tab.

FIG. 1 shows an electrical box 10 secured to a stud 12 of a house or building. Electrical box 10 includes a rear wall 14 with a top wall 16, a right wall 18, a bottom wall 20, and a left wall 22 each extending forward from rear wall 14 and at least partially defining an electrical box cavity 24. A pair of device securing protrusions 26 extend inward from an inner surface of top wall 16 and bottom wall 20 in a particular implementation. The term device securing protrusion is not limited to securing merely an electrical device, but can be used to secure any suitable connection or apparatus within electrical box cavity 24. Further, an aperture 28 is located within each protrusion 26 and opens proximate a front surface 30 of the electrical box.

A pair of tracks 32 are located along an inner surface 34 of left wall 22 in a particular implementation. Tracks 32 each includes rails 36 extending inward from inner surface 34 of left wall 22. A mounting screw tab 38 is slideable within rails 36 of tracks 32 and includes an angled front surface 40. A mounting screw 42 extends through mounting screw tab 38 and is adapted to secure electrical box 10 to stud 12.

Figure 2:
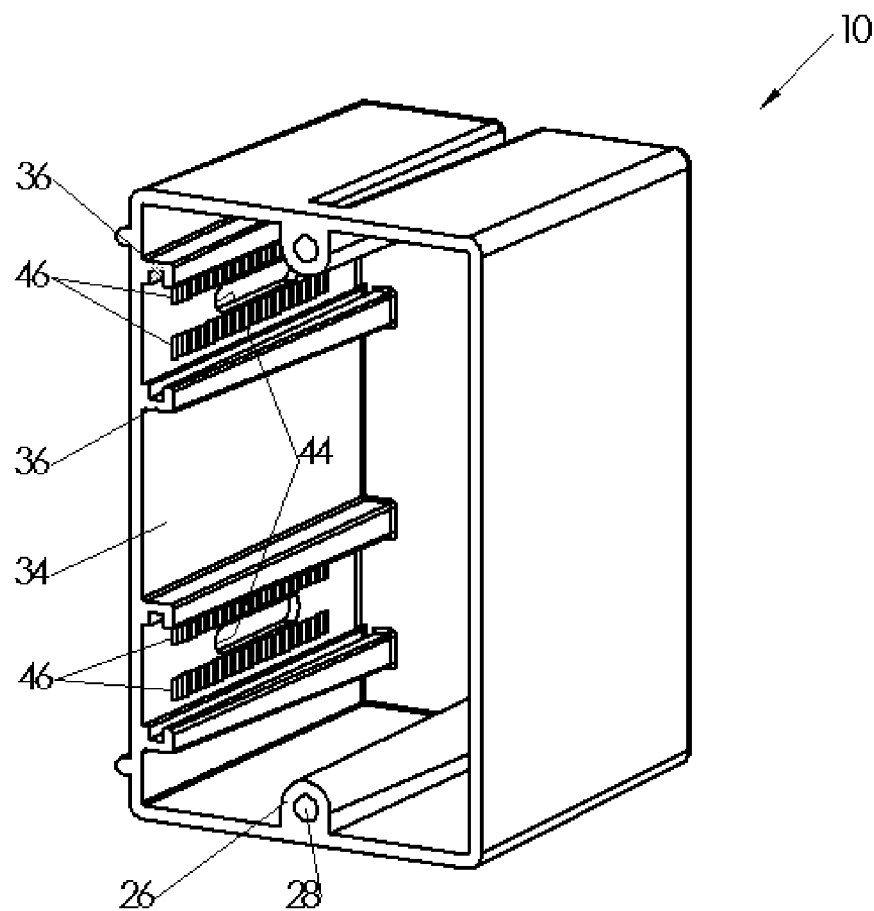
FIG. 2 is a perspective view of an adjustable electrical box with the mounting screw and mounting screw tab removed.

FIG. 2 illustrates electrical box 10 with the mounting screw tab removed and disconnected from stud 12. As can be seen in greater detail, rails 36 of track 32 may be generally u-shaped to provide guidance for the mounting screw tab. An elongated mounting slot 44 is located between rails 36 and may extend for any suitable portion of the electrical box's depth. In one particular implementation, mounting slot 44 is centrally located between rear wall 14 and front surface 30 and extends approximately half of the distance there between. Although the particular implementations are illustrated and described with two mounting slots, any suitable number of mounting slots may be incorporated, including but not limited to a single mounting slot. Further, mounting slot 44 is arranged to receive mounting screw 42 and facilitate securing electrical box 10 to stud 12.

A plurality of teeth 46 are formed in inner surface 34 and may be arranged in any suitable fashion so that the teeth assist in locating and securing the electrical box. In particular implementations, there may be only a single row of the plurality of teeth as seen in FIG. 1, or at least two rows of the plurality of teeth as seen in FIG. 2. Teeth 46 may be located wholly between rails 36 of each track 32 and on the top and bottom of mounting slot 44. In addition, teeth 46 may be arranged vertically so that the mounting screw tab 38 must pass over each tooth as the tab moves forward or backward within electrical box cavity 24.

Figure 3:
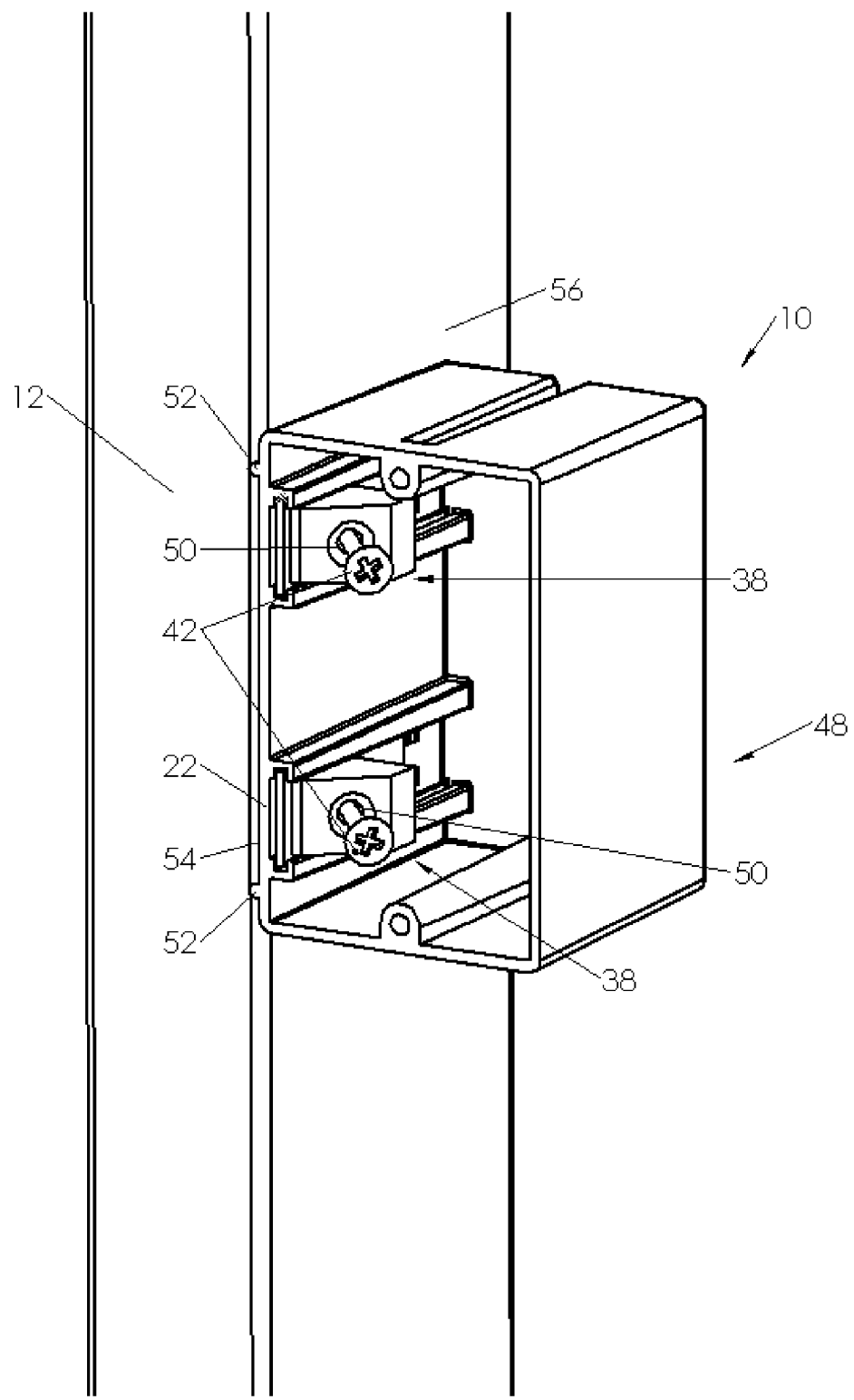
FIG. 3 is a perspective view of an adjustable electrical box with the mounting screw loosened and the box slide to the rear position.

Referring now to FIG. 3, electrical box 10 has been slide forward in the direction associated with arrow 48 after loosening mounting screw 42 from within electrical box cavity 24 to relieve any compression along left side wall 22. In particular, mounting screw 42 passes through a through hole 50 having a countersunk opening in angled face 40. Thus, mounting screw 42 extends through mounting screw tab 38 and mounting slot 44 at an angle to ensure that the operator can manipulate the mounting screw from within electrical box cavity 24 after drywall or a wall surface has been installed around electrical box 10. Advantageously, this arrangement permits movement of the electrical box in a single plane into and out of the wall along an axis perpendicular to the longitudinal axis of stud 12 when the mounting screw tab is located within track 32 but at least partially disengaged from teeth 46.

Electrical box 10 may also include at least one external guide 52 extending outward from an outer surface 54 of the wall having mounting slots 44 therein. External guides 52 may be molded onto outer surface 54 and located proximate mounting slots 44 to provide additional stability when the electrical box is slide forwards or backwards. Further, external guides 52 ride along a surface 56 of stud 12.

Figure 4:
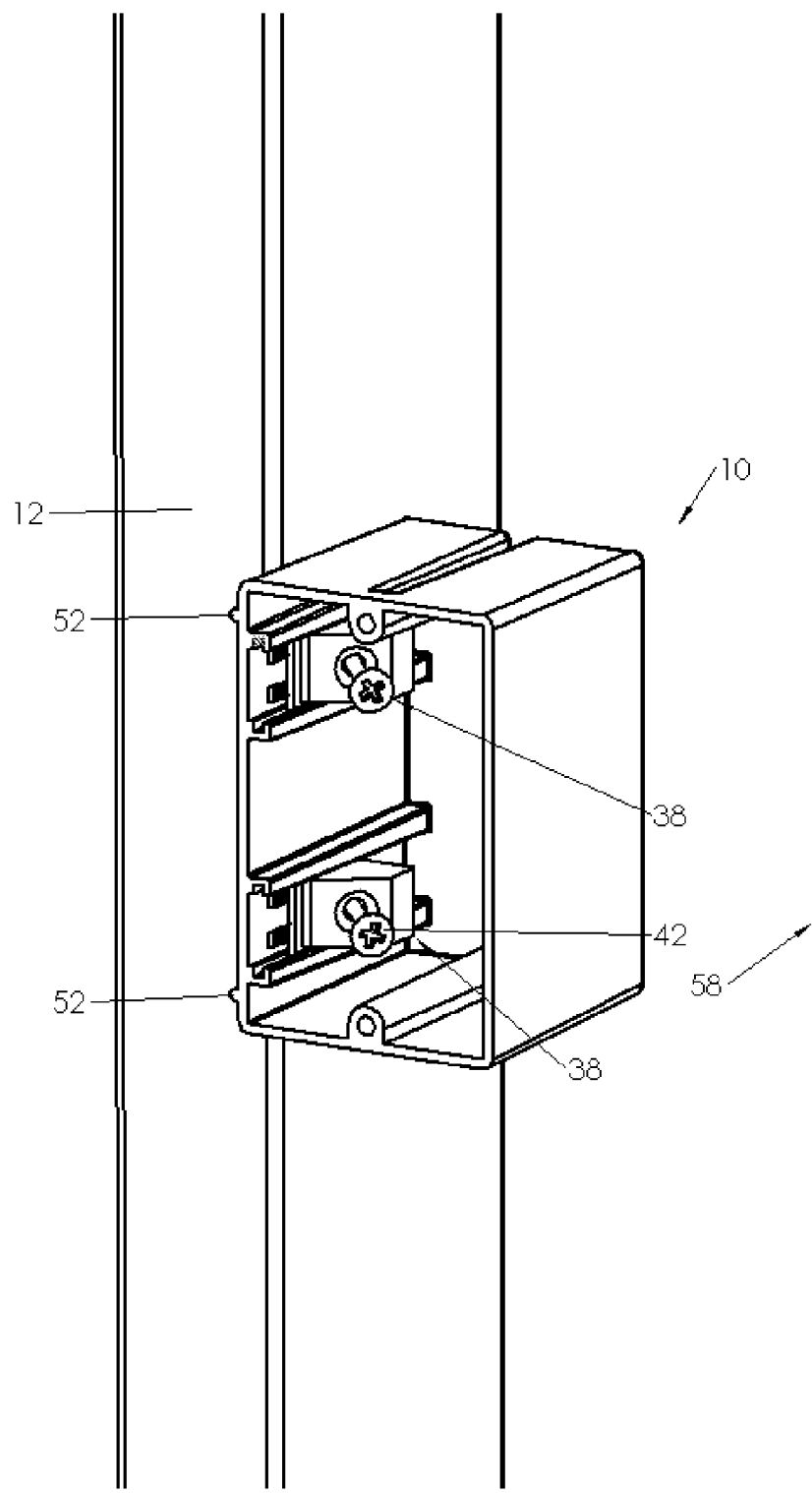
FIG. 4 is a perspective view of an adjustable electrical box with the mounting screw loosened and the box slide to the forward position.

FIG. 4 is similar to FIG. 3, with the exception of the electrical box moved to its rearward most position as indicated by arrow 58. Advantageously, FIGS. 3 and 4 illustrate the total travel of electrical box 10 once installed. Advantageously, mounting screw tab 38 covers mounting slot 44 regardless of the electrical box position to ensure that water or debris cannot enter the electrical box cavity 24.

As seen in FIGS. 3 and 4, the mounting screws 42 are partially disengaged so that teeth 46 on inner surface 34 are disengaged from teeth on mounting screw tab 38 (discussed below). Accordingly, the electrical box can move only in the direction indicated by arrows 48 and 58. In particular, the electrical box movement is limited by mounting screw tabs 38 and rails 36 of tracks 32 which are complimentary shaped to prevent vertical movement, but selectively allow horizontal movement. Still further, when two mounting slots 44 are utilized, the electrical box cannot be rotated once the mounting screws 42 are at least partially installed within stud 12. Finally, when the mounting slots are located on a single side, electrical box 10 can be rotated to mount to stud 12 in any orientation without departing from the box's intended use.

Figure 5:
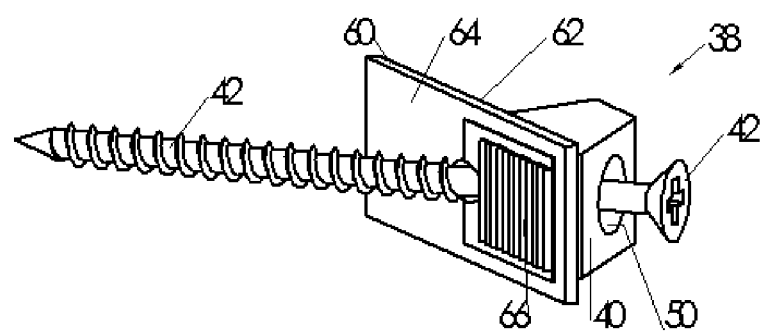
FIG. 5 is a perspective view of a mounting screw tab with a mounting screw.

FIG. 5 illustrates the mounting screw tab 38 removed from electrical box 10 with mounting screw 42 in through hole 50. Mounting screw tab 38 also includes a cover portion 60 having a top surface 62 and a bottom surface 64. A plurality of teeth 66 may be molded into bottom surface 64 and are preferably complimentary shaped to teeth 46 on inner surface 34. Cover portion 60 may be sized wide enough to fit within rails 36 while still permitting free movement into and out of cavity 24. Further, cover portion 60 may be long enough to cover mounting slot 44 regardless of the position of the electrical box. Finally, cover portion 60 may have a thickness, meaning the distance between top surface 62 and bottom surface 64, smaller than the thickness of u-shaped rails 36 so that when the mounting screw is disengaged, the mounting screw tab may be moved towards the middle of cavity 24 to disengage teeth 46 and 66 and permit movement in the directions of arrows 48 and 58 (as seen in FIGS. 3 and 4).

Specifically, teeth 46 on inner surface 34 are interlocked with teeth 66 on bottom surface 64 when mounting screw 44 is in the engaged position, or fully seated within mounting screw tab 38 (as seen in FIG. 1). When mounting screw 44 is in the disengaged position, teeth 66 and 46 can be separated and mounting screw tab 38 is slidable within rails 36 (as seen in FIGS. 3 and 4). Thus, when mounting screw 44 is in the disengaged position, electrical box 10 is movable relative to stud 12, mounting screw 44, and mounting screw tab 38.

In accordance with one particular embodiment, after the electrical box is installed on a stud and the drywall or wall board is installed, the position of the electrical box can be adjusted by loosening the mounting screws and pulling the electrical box forward or pushing it backwards.

In accordance with another particular embodiment, a method of adjusting electrical box 10 is disclosed. The steps of adjusting includes providing the electrical box 10 with mounting slot 44 in a side wall and track 32 at least partially surrounding the mounting slot at inner surface 34. Another step is inserting mounting screw tab 38 with through hole 50 within electrical box 10 and inserting mounting screw 42 in through hole 50. Another step is rotating mounting screw 42 in a first direction from within cavity 24 to mount electrical box 10 to stud 12 and prevent relative movement between electrical box 10 and mounting screw tab 38. Still another step is rotating mounting screw 42 in a second direction opposite the first direction from within cavity 24 to permit movement of mounting screw tab 38 with respect to the track and sliding electrical box 10 to a second position. Another step is rotating mounting screw 42 in the first direction from within cavity 24 to lock electrical box 10 in the second position.

It will be understood that implementations are not limited to the specific components disclosed herein, as virtually any components consistent with the intended operation of a method and/or system implementation for an electrical box may be utilized. Accordingly, for example, it should be understood that, while the drawing figures accompanying text show and describe a rectangular electrical box, an electrical box of the present invention may contain any number of sides. Common electrical box shapes also include round, square, and octagonal. However, an electrical box of the present invention may also be other shapes. Components may comprise any shape, size, style, type, model, version, class, grade, measurement, concentration, material, weight, quantity, and/or the like consistent with the intended operation of a method and/or system implementation for an electrical box.

The concepts disclosed herein are not limited to the specific implementations shown herein. For example, it is specifically contemplated that the components included in a particular implementation of an electrical box may be formed of any of many different types of materials or combinations that can readily be formed into shaped objects and that are consistent with the intended operation of an electrical box. For example, the components may be formed of: rubbers (synthetic and/or natural) and/or other like materials; polymers and/or other like materials; plastics, and/or other like materials; composites and/or other like materials; metals and/or other like materials; alloys and/or other like materials; and/or any combination of the foregoing.

Furthermore, embodiments of the electrical box may be manufactured separately and then assembled together, or any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled or removably coupled with one another in any manner, such as with adhesive, a weld, a fastener, any combination thereof, and/or the like for example, depending on, among other considerations, the particular material(s) forming the components.

In places where the description above refers to particular implementations of an electrical box, it should be readily apparent that a number of modifications may be made without departing from the spirit thereof and that these implementations may be applied to other electrical boxes. The accompanying claims are intended to cover such modifications as would fall within the true spirit and scope of the disclosure set forth in this document. The presently disclosed implementations are, therefore, to be considered in all respects as illustrative and not restrictive, the scope of the disclosure being indicated by the appended claims rather than the foregoing description. All changes that come within the meaning of and range of equivalency of the claims are intended to be embraced therein.

The invention claimed is:

1. An electrical box comprising:
at least four sides extending from a rear wall to an open top;
at least two device securing protrusions, each device securing protrusion of the at least two device securing protrusions comprising an aperture and positioned on a different side of the at least four sides;
one or more tracks positioned on an inner surface of one of the at least four sides, the one or more tracks each comprising two rails protruding inwardly from the inner surface of the one of the at least four sides;
a mounting slot positioned between the two rails of the one or more tracks and extending through the one of the at least four sides; and
a mounting screw tab slidably engaged between the two rails of the one or more tracks, the mounting screw tab comprising a cover portion, an angled front surface extending from the cover portion, and a screw hole extending through the angled front surface and the cover portion, the screw hole positioned to align with at least a portion of the mounting slot.

2. The electrical box of claim 1, wherein:
the one or more tracks comprises two tracks positioned on the one of the at least four sides, each of the two tracks comprising two rails protruding inwardly from the inner surface of the one of the four sides;
the mounting slot comprises two mounting slots, each mounting slot positioned between the two rails of a different track of the two tracks;
the mounting screw tab comprises two mounting screw tabs, each mounting screw tab slidably engaged between the two rails of the different track of the two tracks and comprising the cover portion, the angled front surface extending from the cover portion, and the screw hole extending through the angled front surface and the cover portion, the screw hole positioned to align with at least a portion of the mounting slot.

3. The electrical box of claim 2, further comprising:
a plurality of track teeth on the inner surface of the one of the at least four sides between the two rails of each of the two tracks; and a plurality of mounting tab teeth extending from a bottom surface of the cover portion of each mounting screw tab, the mounting tab teeth shaped engage the track teeth.

4. The electrical box of claim 3 wherein the tab teeth and the track teeth are engaged with each other to prevent relative movement when the mounting screw is in an engaged position and the tab teeth and the track teeth permit relative movement when the mounting screw is in a disengaged position.

5. The electrical box of claim 3 wherein the tab teeth and the track teeth are arranged perpendicular to the rails within each track and on each mounting screw tab.

6. The electrical box of claim 2 wherein the screw hole of each mounting screw tab is disposed at an angle relative to the back side.

7. The electrical box of claim 2 wherein each mounting screw tab is movable in a single plane when the mounting screw tab is located within the respective track.

8. The electrical box of claim 2 wherein the electrical box is movable in a single plane when each mounting screw tab is located within the respective track.

9. The electrical box of claim 1 wherein the electrical box is rotatable to control the at least one mounting slot position.

10. The electrical box of claim 1 wherein the mounting slot between the rails of each track comprises two mounting slots between the rails of each track.

11. The electrical box of claim 10 wherein the electrical box further comprises a track and a plurality of mounting slot teeth proximate each of the mounting slots.

12. The electrical box of claim 11 further comprising a pair of mounting screw tabs each having a plurality of tab teeth wherein each tab is slidingly engaged with the track and the tab teeth are selectively engaged with the mounting slot teeth.

13. The electrical box of claim 12 wherein the tab is slideable with respect to the track and the tab teeth are disengaged from the mounting slot teeth when the mounting screw is in a disengaged position.

14. The electrical box of claim 12 wherein the tab teeth and the electrical box teeth are engaged and prevent slideable movement between the tab and the track.

15. The electrical box of claim 1 further comprising at least one external guide on an outer surface of the first side, the external guide configured for sliding engagement with the stud.

16. The electrical box of claim 15 wherein the at least one external guide is a pair of external guides, each external guide located proximate at least one mounting slot.

17. The electrical box of claim 1, wherein the mounting screw tab covers the entire mounting slot.

18. The electrical box of claim 1 wherein the electrical box is adjustable in a direction perpendicular to the longitudinal axis of the stud.

19. A method of adjusting an electrical box comprising the steps of:
inserting a mounting screw tab between two rails of a track positioned on an inner surface of a one of four sides of the electrical box, the two rails each protruding inwardly from the inner surface of the one and the four sides of the electrical box extending from a rear wall to an open top;
inserting a mounting screw through a screw hole that extends through the mounting tab; and
rotating the mounting screw in a first direction from within the electrical box to mount the electrical box to a stud and prevent relative movement between the electrical box and the mounting screw tab.

20. The method of claim 19 further comprising the steps of:
engaging track teeth positioned on the inner surface of the first side between the two rails of the track with mounting tab teeth positioned on a bottom surface of the mounting tab;
rotating the mounting screw in a second direction opposite the first direction from within the electrical box to permit movement of the mounting screw tab with respect to the track;
sliding the electrical box to a second position; and
rotating the mounting screw in the first direction from within the electrical box to lock the electrical box in the second position.

* * * * *